United States Patent
Sakaguchi et al.

(10) Patent No.: US 6,231,924 B1
(45) Date of Patent: *May 15, 2001

(54) METHOD OF PARTIALLY FORMING OXIDE LAYER

(75) Inventors: Koichi Sakaguchi; Shigeki Nakagaki; Yasuto Sakai, all of Osaka (JP)

(73) Assignee: Nippon Sheet Glass Company, Limited, Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/308,843

(22) PCT Filed: Nov. 25, 1997

(86) PCT No.: PCT/JP97/04290

§ 371 Date: May 26, 1999

§ 102(e) Date: May 26, 1999

(87) PCT Pub. No.: WO98/23548

PCT Pub. Date: Jun. 4, 1998

(30) Foreign Application Priority Data

Nov. 26, 1996 (JP) .................................................. 8-314614
Oct. 14, 1997 (JP) .................................................. 9-280818

(51) Int. Cl.[7] ...................................................... B05D 5/00
(52) U.S. Cl. ........................ 427/266; 427/264; 427/270; 427/271; 427/287; 216/24; 216/97
(58) Field of Search ..................................... 427/264, 266, 427/270, 271, 273, 287; 216/24, 96, 97; 252/79.2

(56) References Cited

U.S. PATENT DOCUMENTS

| | | | |
|---|---|---|---|
| 3,853,648 | * 12/1974 | Janus et al. | 156/7 |
| 3,935,361 | * 1/1976 | Dorfman et al. | 427/131 |
| 4,009,061 | * 2/1977 | Simon | 156/635 |
| 4,900,396 | * 2/1990 | Hayashi et al. | 427/271 |
| 4,968,361 | * 11/1990 | Ames et al. | 427/127 |
| 5,750,202 | * 5/1998 | Roamno et al. | 427/376.4 |

FOREIGN PATENT DOCUMENTS

| | | | |
|---|---|---|---|
| 57140339 | * 3/1982 | (JP) . | |
| 57-140339 | 8/1982 | (JP) | C03C/15/00 |
| 63-112481 | 5/1988 | (JP) | C04B/41/89 |
| 529996 | * 1/1977 | (SU) . | |

OTHER PUBLICATIONS

Perry's Chemical Engineers' Handbook, 6th ed., pp. 3–14 and 3–18, 1973.*

* cited by examiner

*Primary Examiner*—Shrive Beck
*Assistant Examiner*—Kirsten A. Crockford
(74) *Attorney, Agent, or Firm*—Sughrue, Mion, Zinn, Macpeak & Seas, PLLC

(57) ABSTRACT

The present invention provides a method of partially forming oxide layers on a surface of a substrate such as a glass plate by forming an oxide layer on the surface of the substrate, partially contacting the surface of the oxide layer formed on the substrate with an inorganic compound different from the oxide, dissolving partially the layer with the inorganic compound and removing the dissolved components of the layer together with the inorganic compound, by which the oxide layers are partially formed on the surface of the substrate efficiently and surely.

5 Claims, 3 Drawing Sheets

METHOD OF PARTIALLY FORMING OXIDE LAYER

TECHNICAL FIELD

The present invention belongs to a technical field of an inorganic substrate having formed thereon oxide layer, which is used for automobiles, buildings, various industrial instruments, etc. Particularly, the invention belongs to a technical field of an inorganic substrate having formed oxide layer on the necessary portions only of the surface thereof.

BACKGROUND ART

On the surface of a glass plate or a ceramic plate, oxide layers having various functions according to the use are formed. For example, as glasses used for automobiles, vehicles, buildings, etc., a heat-reflective layer containing the oxide of titanium, cobalt, etc., is generally used for the purpose of reducing the cooling load, etc. Also, as glass substrates for various displays, an electrically conductive film comprising tin oxide, etc., is used from the necessity of element driving. These layers are frequently formed on only parts of the surface of a substrate for the necessity of each use described above.

In not only the use of display but also other uses of automobiles, buildings, etc., there is a case of requiring that the layer is partially formed. For example, in the case of using a heat-reflective glass for the back window of automobile, it is required that a layer is not formed on the glass surface adjacent to a high-mount stop lamp disposed in the inside of the back window of the automobile but a layer is formed on other portion of the glass surface for shielding heat rays while ensuring visibility of the lamp.

In such a case, a method of foaming the layer after previously applying masking to the necessary portion of the glass plate or a method of applying masking after forming a layer on the whole glass plate and removing the remaining unmasked portion of layer with a solvent, by releasing, or polishing, etc., is employed.

However, according to the conventional methods as described above, masking is required in any method, which is accompanied by complicated steps and operations, and thus the effective and ensure partial formation of layer has been difficult by the conventional methods.

DISCLOSURE OF THE INVENTION

The present invention has been made for solving the above-described problems and an object of the present invention is to provide a method of partially forming a layer on the surface of a substrate by a simple and ensure method.

According to the present invention, the above-described object can be attained by the method of partially forming an oxide layer on the surface of an inorganic substrate, comprising a step of forming a layer comprising an oxide on the surface of the inorganic substrate, a step of contacting the layer of a definite range to be removed with other inorganic compound than the above-described oxide to dissolve the above-described layer of the definite range with the inorganic compound, and a step of removing the dissolved layer of the above-described definite range together with the above-described inorganic compound.

Also, the preferred embodiments of the present invention are as follows.

(1) The melting point of the above-described inorganic compound is 500° C. or lower or the softening point thereof is 500° C. or lower.

(2) The above-described dissolving step is a step of carrying out the dissolution by heating the oxide layer of the definite range together with the above-described inorganic compound.

(3) The above-described inorganic compound includes at least one kind selected from the group consisting of phosphorus compounds each containing oxygen as a constituent and boron compounds each containing oxygen as a constituent.

(4) The above-described phosphorus compound includes at least one kind selected from the group consisting of phosphoric acid and phosphates and the above-described boron compound includes boric acid and borates.

(5) The above-described inorganic compound is a glass and contains at least one kind selected from the group consisting of $P_2O_5$, PbO, $B_2O_3$, ZnO, and $Bi_2O_3$ as the constituent.

The inorganic compound used in the present invention may be an inorganic compound which can dissolve the oxide of the layer when the compound is contacted with the oxide constituting the layer and further the contacted layer is heated and can keep the structure and the physical characteristics of the inorganic substrate, and can be properly selected according to the properties of the layer and the substrate. As a method of removing the above-described inorganic compound after dissolving the layer, a physical means and/or a chemical means can be applied. For example, as the physical means, there are wiping off, blowing off, etc., and as the chemical means, there are dissolving of the layer with a solvent, etc. As a preferred embodiment of a preferred removing means of a layer, there is cleaning with an organic solvent such as alcohols (e.g., methanol and ethanol) followed by drying and as the case may be, the means can be carried out together with the above-described physical means.

In the present invention, it is preferred that about the layer to be removed, which corresponds to the region of existing the inorganic compound contacted with the layer, all the layer of the corresponding region is removed, but the residue of the layer to an extent of not preventing the visibility can be allowed in this invention.

As the inorganic compounds which are generally used in this invention, there are phosphorus compounds containing oxygen as the constituent, boron compounds containing oxygen as the constituent, etc., each having a melting point of 500° C. or lower and being a liquid at normal temperature. Preferably, there are phosphoric acids, phosphates, boric acid, and borates satisfying the above-described conditions as shown below. The phosphoric acid in this invention means the general names of the acids formed by the hydration of diphosphorus pentoxide and includes orthophosphoric acid ($H_3PO_4$, liquid at normal temperature), pyrophosphoric acid ($H_4P_2O_7$, liquid at normal temperature), triphosphoric acid ($H_5P_3O_{10}$, liquid at normal temperature), etc. Also, practical examples of the phosphate include sodium dihydrogenphosphate ($NaH_2PO_4$) (typically, dihydrate: $NaH_2PO_4.2H_2O$, melting point 60° C.) and potassium dihydrogenphosphate ($KH_2PO_4$, melting point 96° C.). The borates practically include boric acid ($H_3BO_3$, melting point 185° C.), etc.

Furthermore, as the inorganic compound having a melting point of 500° C. or lower, there are glasses. As the glass, glasses having generally a low-melting point composition (so-called low-melting glasses) are suitable and the glasses containing $P_2O_5$, $B_2O_3$, ZnO, PbO, $Bi_2O_3$, etc., are preferred. Practically, the glass composition series such as an $R_2O$—$P_2O_5$ series, an $R_2O$—$B_2O_3$ series, a PbO—$B_2O_3$—ZnO series, a PbO—$SiO_2$—$B_2O_3$ series, a $Bi_2O_3$—ZnO—$B_2O_3$ series, an $R_2O$—ZnO—$SiO_2$—$B_2O_3$ series, a ZnO—$B_2O_3$ series, an $R_2O$—ZnO—$P_2O_5$ series (wherein, R represents an alkali metal such as Na, K, etc.), etc., can be suitably used.

In the present invention, it is a feature that by contacting the inorganic compound with the oxide constituting the layer, the layer is dissolved. To practice the dissolution of the layer, it is more preferred that the inorganic compound is contacted with only a portion of the surface of the layer and dissolution of the layer is progressed.

Furthermore, it is preferred to dissolve the layer by heating in the state that the inorganic compound is contacted with the oxide constituting the layer. To practice the dissolution of the layer, it is more preferred to contact the inorganic compound with only a part of the surface of the layer and progress the dissolution of the layer by heating.

As a method of selectively contacting the inorganic compound with a part of the layer, the following method can be illustrated.

(1) A liquid, powders, or granules each containing the inorganic compound are placed on a part of the surface of the layer.

(2) A paste obtained by mixing the inorganic compound with an organic solvent, a solid powder, etc., is coated on a part of the surface of the layer.

(3) A liquid formed by dissolving or dispersing the inorganic compound in a solvent is coated on a part of the surface of the layer and, if necessary, the coated surface is dried.

(4) A substance attached or impregnated with the inorganic compound is placed on a part of the surface of the layer.

After contacting the inorganic compound with a part of the surface of the layer by the method typified by these methods (1) to (4), the substrate is generally heated (as the case may be, the circumference only of the inorganic compound thus applied is heated). When the inorganic compound is originally a solid, the compound is melted by a heating step. Before melting the inorganic compound, the powders, the granules, the paste, etc., is usually fluidized and attached to the surface of the layer.

There is no particular limitation on the organic solvent in the method (2) but a water-soluble organic solvent is preferred. As the water-soluble, a mixture of one kind of water-soluble resins such as a modified ethyl cellulose resin, a modified polyamide resin, and polymers such as n-vinylpyrrolidone, etc.) and one kind of water-soluble solvents such as oxyethylene glycol ether, propylene glycol, and propylene glycol ether) is preferably used. The mixing ratio of the mixture is properly controlled according to the kinds and the amounts of the inorganic compound, the solid powder, etc.

When the inorganic compound is a liquid substance, the compound can be selectively contacted with the desired portion(s) of the surface of the layer without need of a heating step. Also, when the inorganic compound is a liquid substance, the substance itself previously heated and can dissolve the desired portions of the layer by a method of directly blowing onto the portions, dropping onto the portions, etc. In this case, it is preferred to heat the substrate to the same temperature as the temperature of heating the substance, particularly in the case of a glass substrate, from the point of preventing the substrate from being broken by heating.

Considering the heat efficiency in the heating step as described above, when the inorganic compound is a solid, the melting point thereof is generally preferably low and for example, when the substrate is a glass plate, it is required that the melting point of the inorganic compound is lower (when a soda-lime glass is used as the substrate, 735° C. or lower) than at least the softening point (the temperature at which the viscosity is $4.5 \times 10^7$ poise) of the glass. In addition, when a glass is used as the inorganic compound, it is required that the softening point of the glass is lower than the softening point of the glass constituting the substrate. The softening point of the inorganic compound or the softening point of a glass is preferably 500° C. or lower, more preferably 350° C. or lower, and most preferably 200° C. or lower, from the points of energy saving and the ease of handling.

There is no particular limitation on the inorganic substrate used in this invention but a glass plate is suitable. Also, there is no particular limitation on the glass plate and the plates of a borosilicate glass, an aluminosilicate glass, and various kinds of crystallized glasses can be used but typically the plate of a soda silicate glass (soda-lime silica glass) is used. Also, the substrate made up of a ceramic such as alumina may be used.

As the oxide layer used in this invention, a film which functions as a heat-reflecting film, a heat-absorbing film, a colored film, an electrically conductive film, etc., can be used. Furthermore, the oxide layer may contain, in addition to the oxide, a nitride, a carbide, a metal, etc., in the range of not reducing the above-described objects of this invention.

For example, the heat-reflective film includes a film comprising the oxide of at least one element of cobalt, nickel, chromium, iron, titanium, tin, and antimony. More practically, there are a film comprising titanium oxide as the main constituent, a film comprising the oxide of a metal including cobalt as the main constituent, a film comprising the oxides of tin and antimony as the main constituents, etc. The heat-reflective film may further properly contain silicon, aluminum, zinc, copper, indium, bismuth, vanadium, manganese, zirconium, etc., in addition of the above-described element for reducing the reflectance and finely controlling the color tone.

Also, the electrically conductive film includes a film comprising tin oxide added with slide components) (one or two or more kinds of chlorine, fluorine, antimony, etc.), a film essentially comprising indium oxide or comprising indium oxide containing tin, a film comprising zinc oxide added with a slight amount of other component (e.g., aluminum), etc.

As a method of forming a layer from an oxide, a sputtering method, a vacuum vapor deposition method, a liquid-phase film-forming method, etc., as well as a so-called thermal decomposition method, that is, a method of forming an oxide film on the surface of a substrate by thermally decomposing a raw material compound on the surface of a high-temperature glass plate and oxidizing can be used. As the thermally decomposing method, a method of coating a metal compound on the surface of a substrate followed by burning, a method of sending the vapor of a metal compound onto a substrate heated to a high temperature (CVD method), a method of blowing a solution or a dispersion obtained by dissolving or dispersing a metal compound in an organic solvent as fine liquid droplets (splaying method), etc., can be used.

In addition, as the step of forming the oxide layer, a step of forming a layer on the surface of a glass ribbon in a floating production method is preferred. A method of continuously forming an oxide layer on the surface of a glass ribbon by a thermal decomposition method in a floating production method is a preferred film-forming method in the production efficiency because the remaining heat of the glass melt can be utilized for the formation of the layer but a simple method of patterning by partially removing a layer has not yet been found. The present invention can be particularly suitably practiced for such film-forming.

The numerals are as follows.

1: Inorganic substrate, 2 and 12: Oxide layer,

3: Inorganic compound powder,

13: Paste containing an inorganic compound, 4 and 14: Dissolved layer portion,

5: Layer-removed portion, and

15: Back window for automobile.

An embodiment of the practice of the present invention is explained by FIG. 1. On the surface of an inorganic substrate 1 is formed an oxide layer 2 (FIG. 1(a)) and powders 3 of an inorganic compound are placed on definite ranges of the layer 2 (FIG. 1(b)). The substrate having formed thereon the layer is then heated to fluidize the powders 3, whereby the inorganic compound is contacted with the surface of the layer in a molten state. The inorganic compound dissolves the layer and said portions become the states that the dissolved components of the layer intermix in the inorganic compound (FIG. 1(c)). When the substrate is immersed in a liquid or is washed with a liquid, the inorganic compound having intermixed therein the dissolved components of the layer is dissolved in the liquid. Thereby, the layer of the portions is removed, and as a result, the layers are partially formed on the surface of the substrate 1.

Figure 1A:
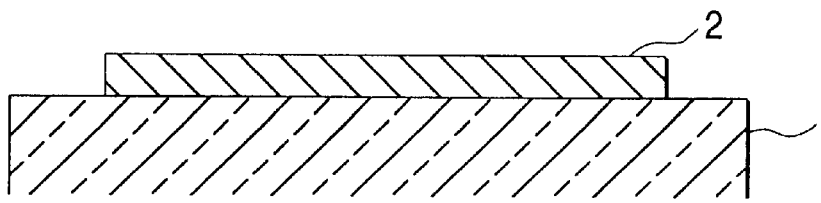
FIG. 1(a)–FIG. 1(d) are schematic views showing an embodiment of the present invention from the direction of the cross-section of a substrate.
Figure 1B:
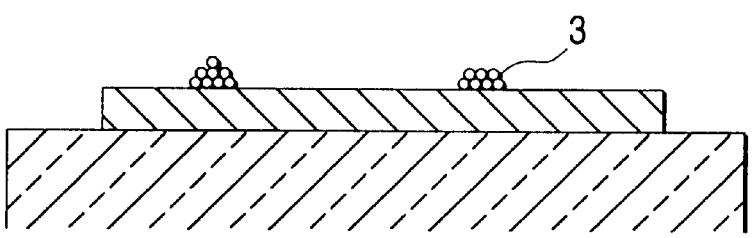
Figure 1C:
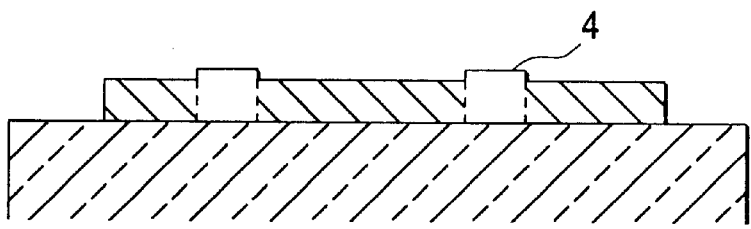
Figure 1D:
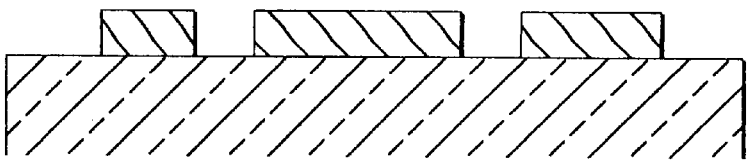
Figure 2:
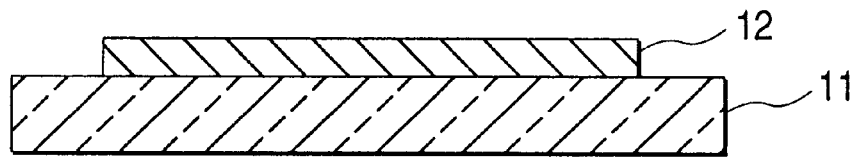
FIG. 2(a)–FIG. 2(d) are schematic views showing other embodiment of the present invention from the direction of the cross-section of a substrate.
Figure 2:
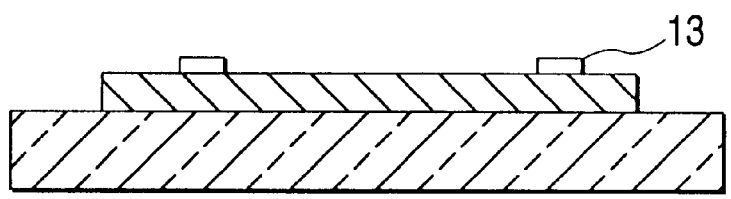
Figure 2:
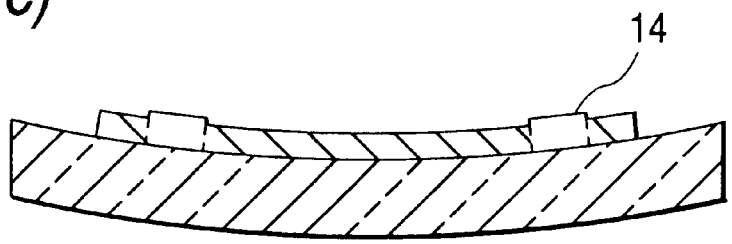
Figure 2:
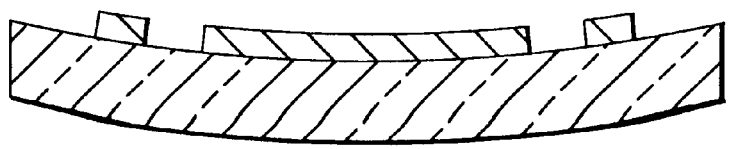

Other embodiment of the present invention is explained by FIG. 2. On the surface of a glass plate 11 is formed an oxide layer 12 (FIG. 2(a)) and a pasty compound 13 obtained by adding an organic solvent to an inorganic compound is placed on definite portions of the surface of the layer 12 (FIG. 2(b)). The glass plate 11 is then heated to fluidize the paste 13 and the inorganic compound contained therein is contacted to the surface of the layer in a molten state. The inorganic compound dissolves the layer, whereby said portions become the state that the dissolved components of the layer are intermixed in the inorganic compound (FIG. 2 (c)). Together with the heating step described above, a bending work is applied to the heated glass plate 11 to make a definite form. Furthermore, the heated glass plate 11 is quenched to cause a compression stress on the surface to provide a so-called tempered glass. Finally, when the substrate is immersed in a liquid or washed with a liquid, the inorganic compound having intermixed therein the dissolved components of the layer is dissolved in the liquid. Thereby, the layer of the portions is removed and as a result, the layers are partially formed on the surface of the molded and tempered glass 11.

In addition, in the above-described embodiments, the case that the inorganic compound was solid at normal temperature was described but when the inorganic compound is a liquid substance at normal temperature, such as phosphoric acid, etc., the embodiment of this case is also the same as above except the point that the inorganic compound is in a liquid state before the heating step.

Figure 3:
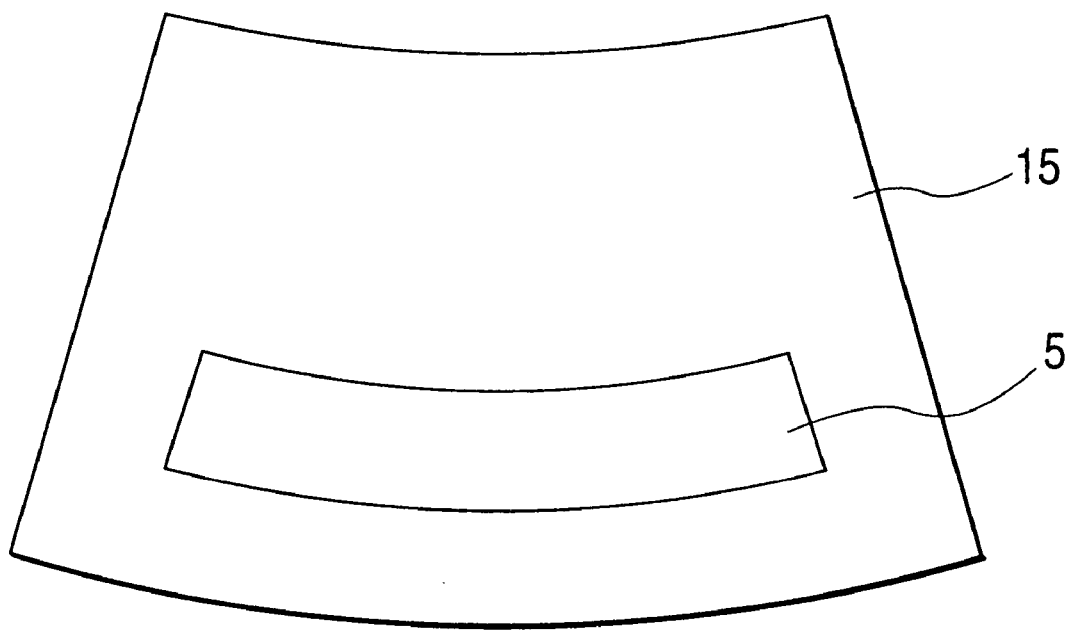
FIG. 3 is a schematic view showing an embodiment in the case of applying the present invention to a back window of an automobile.

When a glass plate is used as the inorganic substrate as in the embodiment of the present invention shown in FIG. 2, by utilizing the heating step at dissolving the inorganic compound and the layer, tempering and/or a bending work of the glass plate can be practiced. When melting of the layer and the secondary work of a glass plate as described above are practiced by the same heating step, the production method is very advantageous in the production efficiency. In addition, the tempered and bending worked glass plate described above is useful as a glass for automobile and, in particular, when only the portion of the layer necessary for the visibility of a high-mount stop lamp is removed, the glass becomes useful as a glass for a back window of automobile (see, FIG. 3). As the oxide layer in this case, a heat-reflective film can be illustrated.

BEST MODE FOR CARRYING OUT THE INVENTION

The present invention is described in detail below by the following examples.

EXAMPLE 1

A substantially green soda-lime silica glass (visible light transmittance 81% by light source A, and hereinafter the same) having a size of 150 mm×150 mm and a thickness of 3.4 mm was washed and dried to provide a substrate. The substrate was fixed by a hanging means and maintained for 5 minutes in an electric furnace set at 650° C. Thereafter, the glass plate was taken out and a raw material liquid described below was sprayed onto the substrate using a commercially available spray gun under the conditions of an air pressure of 3.0 kg/cm$^2$, an air amount of 90 liter/minute, and a straying amount of 20 ml/minute.

As a result, an oxide layer composed of cobalt, chromium, and iron was formed as a heat-reflective film. The result of obtaining the weight percentages of cobalt, iron, and chromium occupying the total metal weights per unit area of the heat-reflective film by a high-frequency plasma emission spectrochemical analysis showed that cobalt was 84%, chromium 10%, and iron 6%. In addition, the above-described raw material liquid was prepared by dissolving 12.5 g of dipropionylmethane of trivalent cobalt, 0.62 g of acetyl acetonate of trivalent iron, and 1.83 g of acetyl acetonate of chromium in 100 ml of toluene.

Then, a 1:1 (by weight ratio) mixture of sodium dihydrogenphosphate ($NaH_2PO_4.2H_2O$, melting point 60° C.) and ethanol was coated on an area of a part (50 mm×50 mm) of the surface of the layer thus formed at a thickness of about 10 $\mu$m. Thereafter, the substrate was maintained in an electric furnace maintained at a temperature of 200° C. for 3 minutes to evaporate off organic materials and further the heat-reflective glass was maintained in the same electric furnace at a temperature of 650° C. for 5 minutes. When after cooling, the substrate was washed to remove the coated material, the visual check revealed that the layer at the portion had been removed and the surface of glass was partially exposed.

When about the layer-removed portion and the layer-remaining portion, each visible light transmittance was measured to determined whether or not the above-described layer was completely removed, the visible light transmittance of the layer-removed portion was 81%, which was the same as that of the soda-line silica glass of the substrate before forming the layer, while the visible light transmittance of the layer-remaining portion was 31%. From the result, it was confirmed that the above-described layer had been completely removed.

Also, even when a tempering treatment of the glass plate was carried out by blowing a compressed air onto the glass plate after the above-described heat-treatment step of 650° C., the same result as above was obtained. Furthermore, when a tempering treatment of the glass plate was carried out by applying a bending work to the glass plate while quenching by blowing a compressed air onto the glass plate after the above-described heat treatment of 650° C., the same result as above was obtained.

In addition, when the sodium ion concentration on the surface of the glass plate obtained in the example was measured by a secondary ion mass spectrographic method (SIMS), it was found that the ion concentration differs between the layer-removed portion and the layer-remaining portion.

EXAMPLE 2

When the formation of layer and the treatment were practiced by following the same procedure as Example 1 except that potassium dihydrogenphosphate ($KH_2PO_4$, melting point 96° C.) was used as an inorganic compound in place of sodium dihydrogenphosphate, a heat-reflective film could be partially formed as in Example 1. The visible light transmittance was 81% at the layer-removed portion and 31% at the layer-remaining portion.

EXAMPLE 3

By following the same procedure as Example 1 except that boric acid ($H_3BO_3$, melting point 185° C.) was used as an inorganic compound in place of sodium dihydrogenphosphate, a heat-reflective film was partially formed. The visible light transmittance was 81% at the layer-removed portion and 31% at the layer-remaining portion.

EXAMPLE 4

To a solution obtained by dissolving 100 g of sodium dihydrogenphosphate ($NaH_2PO_4 \cdot 2H_2O$, melting point 60° C.) in 200 g of water was added 100 g of ethanol. While sufficiently stirring the liquid, the liquid was blown onto a definite range of the heat-reflective layer as same as in Example 1 using a spray gun. Thereafter, patterning was practiced as in Example 1. The visible light transmittance was 81% at the layer-removed portion and 31% at the layer-remaining portion.

EXAMPLE 5

By following the same procedure as Example 1 except that a low-melting glass powder (softening point about 300° C.) having a glass composition of 81% of PbO, 4% of ZnO, and 15% of $B_2O_3$ by weight ratio was used as an inorganic compound in place of sodium dihydrogenphosphate, a heat-reflective film was partially formed. The coated substrate was washed with warm water of 85° C. The visible light transmittance was 81% at the layer-removed portion and 31% at the layer-remaining portion.

EXAMPLE 6

A paste was prepared by mixing orthophosphoric acid ($H_3PO_4$, liquid at normal temperature), water-soluble organic solvents (a mixture of polyamide, a cellulose, and propylene glycol), and a carbon powder at 1:1:0.6 by weight ratio. The paste was coated on a part of the layer as same as in Example 1 at a thickness of about 10 $\mu$m. Thereafter, the coated substrate was heat-treated by maintaining for 5 minutes in an electric furnace maintained at a temperature of 200° C. When after cooling, the coated paste was removed by washing, the layer at the paste-coated portion had been completely removed and thus a heat-reflective film could be partially formed. The glass was subjected to a tempering treatment by heating to 650° C. in a bend-tempering furnace to apply a bending work and quenching by blowing compressed air onto the glass as in Example 1. The visible light transmittance was 81% at the layer-removed portion and 31% at the layer-remaining portion.

EXAMPLE 7

A colorless soda-lime silica glass (visible light transmittance 88%) having a size of 150 mm×150 mm and a thickness of 6 mm was used as a substrate, and the raw material liquid described below was blown onto the substrate as in Example 1 for about 5 seconds under the conditions of an air pressure of 1.5 kg/cm$^2$, an air amount of 50 liters/minute, and a spraying amount of 100 ml/minute. As a result, an oxide layer composed of cobalt, nickel, and iron was formed as a heat-reflective film. The result of obtaining the weight percentages of cobalt, nickel, and iron occupying the total metal weights per unit area of the heat-reflective film by a high-frequency plasma emission spectrochemical analysis showed that cobalt was 70%, nickel 21%, and iron 9%. The above-described raw material liquid was prepared by dissolving 2.7 g of acetyl acetonate of trivalent cobalt, 0.6 g of dipropionyl methane of divalent nickel, and 0.3 g of acetyl acetonate of trivalent iron in 100 ml of toluene.

Thereafter, by practicing patterning of the layer and bend-tempering of the glass as in Example 6, a heat-reflective film was partially formed. The visible light transmittance was 88% at the layer-removed portion and 37% at the layer-remaining portion.

EXAMPLE 8

A paste was prepared by mixing pyrophosphoric acid ($H_4P_2O_7$, liquid at normal temperature), the water-soluble organic solvents as used in Example 6, and a carbon powder at 1:1:0.65 by weight ratio. Using the paste, as the case of the layer in Example 7, a heat-reflective film was partially formed. The visible light transmittance was 88% about the layer-removed portion and 37% about the layer-remaining portion.

EXAMPLE 9

A colorless soda-lime silica glass (visible light transmittance 88%) having a size of 150 mm×150 mm and a thickness of 6 mm was used as a substrate and a raw material solution prepared by mixing dibutyltin fatty acid [(C$_4$H$_9$)$_2$Sn(OCOC$_7$H$_{15}$)$_2$], toluene, xylene, isopropyl alcohol, and triphenyl antimony was blown onto the substrate by a spray gun. As a result, an oxide film composed of tin and antimony was formed as a heat-reflective film.

Then, pyrophosphoric acid was attached to all over the surface of 30 mm×30 mm of charcoal cut into the size of 30 mm×30 mm×10 mm. The charcoal was calmly placed on the surface of the layer such that the liquid-attached surface was in contact with the layer and they were heat-treated by maintaining for 5 minutes in an electric furnace maintained at a temperature of 200° C. When after cooling, the charcoal was removed and the liquid components were removed by washing, the layer at the liquid-contact portion had been completely removed and a heat-reflective film composed of the oxides of tin and antimony as the main constituents could be partially formed. The visible light transmittance was 88% at the layer-removed portion and 69% at the layer-remaining portion.

EXAMPLE 10

A colorless soda-lime silica glass (visible light transmittance 88%) having a size of 150 mm×150 mm and a thickness of 6 mm was used as a substrate, a raw material solution formed by mixing titanium di-normalpropoxybisacetyl acetonate, toluene, and xylene was blown onto the substrate as in Example 1 by a commercially available spray gun. As a result, an oxide film composed of titanium was formed as a heat-reflective film.

Then, a sponge made of carbon fibers was impregnated with pyrophosphoric acid was calmly placed on the layer and while contacting pyrophosphoric acid impregnated in the sponge with the layer, the substrate was heat-treated by maintaining for 5 minutes in an electric furnace maintained at a temperature of 200° C. When after cooling, the carbon fiber-made sponge was removed and liquid components were removed by washing, the layer at the sponge liquid-contacted portion had been completely removed and the heat-reflective film composed of titanium oxide as the main constituent could be partially formed. The visible light transmittance was 88% at the layer-removed portion and 62% at the layer-remaining portion.

EXAMPLE 11

To 1 mol of titanium isopropoxide with stirring was added dropwise 2 mols of acetyl acetone by a dropping funnel to provide a titanium oxide raw solution. Also, to 50 g of ethyl silicate were added 6 g of 0.1 N hydrochloric acid and 44 g of ethyl cellosolve followed by stirring for 2 hours at room temperature to provide a silicon oxide raw solution. Furthermore, to 10 g of cerium nitrate hexahydrate was added 7.16 g of ethyl cellosolve and the mixture was stirred for one hour at a temperature of 90° C. to provide a cerium oxide raw liquid containing 23.2% CeO$_2$ solid component. Still further, by adding 9.00 g of ethyl cellosolve to 1 g of chloroauric acid tetra-hydrate, a gold fine particle raw liquid was prepared. Also, by adding 18.8 g of ethyl cellosolve to 10 g of iron nitrate nonahydrate, an iron oxide raw solution was obtained.

To a mixture of 0.433 g of the iron oxide raw solution, 1.31 g of the titanium oxide raw solution, 1.41 g of the cerium oxide raw liquid, and 0.815 g of silicon oxide raw solution described above was added 8.03 g of ethyl cellosolve and finally 3.00 g of the gold fine particle raw liquid was added followed by mixing with stirring to prepare a coating liquid.

A substantially green soda-line silica glass (visible light transmittance 74%) having a thickness of 3.4 mm was used as a substrate and the above-described coating liquid was coated on the substrate by spin coating at a rotation number of 1000 rpm for 15 seconds. After air drying, the substrate was heat-treated at 250° C. for 2 hours to deposit the gold fine particles. Then, burning was carried out at 720° C. for 105 seconds to form a colored film of 210 nm in thickness on the glass plate.

A paste obtained by mixing orthophosphoric acid, the water-soluble organic solvents, and a carbon powder as in Example 6 was coated on the colored film, the glass plate was heat-treated by maintaining for 5 minutes in a furnace maintained at a temperature of 250° C., and when after cooling, the coated film was washed, the colored film at the paste-coated portion had been completely removed and the colored film was partially formed. The visible light transmittance was 74% at the layer-removed portion and 27% at the layer-remaining portion.

EXAMPLE 12

A raw material liquid was prepared as in Example 11, coated on a glass plate by a spin coating method, and after air drying, the glass plate was heat-treated at 250° C. for 2 hours, whereby a colored film of 310 nm in thickness having deposited thereon gold particles was formed on the glass plate.

A paste obtained by mixing orthophosphoric acid, the water-soluble organic solvents, and a carbon powder as in Example 6 was coated on the colored film, the glass plate was heat-treated by maintaining for 5 minutes in a furnace maintained at a temperature of 150° C., and when after cooling, the coated film was washed, the colored film at the paste-coated portion had been completely removed. By applying the bend-tempering treatment as in Example 1 to the glass plate, a tempered bent glass plate having partially formed thereon colored films was obtained. The thickness of the colored film after the bend-tempering treatment was 210 nm. The visible light transmittance was 74% at the layer-removed portion and 27% at the layer-remaining portion.

In addition, the composition of the colored films obtained in Examples 11 and 12 was 16.1% of Au, 18.2% of SiO$_2$, 24.2% of TiO$_2$, 36.6% of CeO$_2$, and 4.9% of Fe$_2$O$_3$ by weight percentage.

EXAMPLE 13

A substantially green soda-lime silica glass (visible light transmittance 81%) having a thickness of 3.4 mm was used as a substrate and the raw material liquid described below was blown onto the substrate as in Example 1 for 5 seconds under the conditions of an air pressure of 1.5 kg/cm$^2$, an air amount of 50 liters/minute, and a spraying amount of 100 ml/minute. As a result, an oxide film composed of cobalt, iron, chromium, and nickel was formed as a heat-selective film. The result of obtaining the weight percentages of cobalt, iron, chromium, and nickel, occupying the total metal weights per unit area of the heat-reflective film by a high-frequency plasma emission spectrochemical analysis showed that cobalt was 59.0%, iron 18,5%, chromium 22.0%, and nickel 0.5%. The above-described raw material liquid was prepared by dissolving 7.44 g of acetyl acetonate of trivalent cobalt, 0.52 g of dipropionylmethane of divalent nickel, 1.87 g of acetyl acetonate of trivalent iron, and 1.83 g of acetyl acetonate of chromium in 300 ml of toluene.

Then, while maintaining the glass substrate to 150° C., orthophosphoric acid heated to 150° C. was partially blown onto the substrate by spraying. When after cooling, the attached liquid was removed by washing, the layer at only the liquid-blown portion had been removed and the heat-reflective film could be partially formed. Thereafter, the glass plate was subjected to bend-tempering. The visible light transmittance was 81% at the layer-removed portion and 36% at the layer-remaining portion.

EXAMPLE 14

A substantially green soda-lime silica glass (visible light transmittance 81%) having a thickness of 3.4 mm was used as a substrate and the raw material liquid described below was blown onto the substrate as in Example 13 for 5 seconds under the conditions of an air pressure of 1.5 kg/cm$^2$, an air amount of 50 liters/minute, and a spraying amount of 100 ml/minute. As a result, an oxide film composed of cobalt and nickel was formed as a heat-selective film. The result of obtaining the weight percentages of cobalt and nickel occupying the total metal weights per unit area of the heat-reflective film by a high-frequency plasma emission spectrochemical analysis showed that cobalt was 73.8% and nickel 26.2%. The above-described raw material liquid was prepared by dissolving 7.12 g of acetyl acetonate of trivalent cobalt and 3.13 g of dipropionylmethane of divalent nickel in 300 ml of toluene.

Then, while heating the glass substrate to 150° C., orthophosphoric acid heated to 150° C. was partially added dropwise to the surface of the layer. When after cooling, the attached liquid was removed by washing, the layer at only the liquid-dropped portion had been removed and the heat-reflective film could be partially formed. Thereafter, the glass plate was subjected to bend-tempering. The visible light transmittance was 81% at the layer-removed portion and 34% at the layer-remaining portion.

EXAMPLE 15

Orthophosphoric acid was partially coated on the surface of the layer as same as in Example 1 at a thickness of about 1 mm and the substrate was allowed to stand for 24 hours at normal temperature (25° C.). When thereafter, the attached liquid was removed by washing, the layer at the coated portion with orthophosphoric acid had been completely removed and a heat-reflective film could be partially formed. The glass plate was heated to 650° C. in a bend-tempering furnace and subjected to a tempering treatment by applying bending work and quenching by blowing a compressed air thereto. The visible light transmittance was 81% at the layer-removed portion and 31% at the layer-remaining portion regardless of the application or non-application of bend-tempering.

INDUSTRIAL APPLICABILITY

According to the present invention, after forming an oxide layer on an inorganic substrate, a partial formation of a layer can be efficiently and surely practiced without need of masking accompanied by a complicated step and a troublesome operation. By such a partial formation of the layer, functions such as an electrically conductive property, a heat-reflective property, etc., can be simply imparted to the surface of an optional substrate.

What is claimed is:

1. A method of partially forming oxide layers on a surface of an inorganic substrate, consisting essentially of:
    (a) a step of forming a layer comprising an oxide on the surface of an inorganic substrate;
    (b) a step of contacting a fixed portion of the oxide layer of step (a) with a paste comprising an inorganic compound, organic solvents, and carbon powder in order to dissolve the oxide layer of step (a) with the paste, wherein said inorganic compound is not the same as the oxide of step (a); and
    (c) a step of removing the dissolved portion of the oxide layer from step (b) together with the paste,
wherein said inorganic substrate is a glass plate.

2. A method of partially forming oxide layers as claimed in claim 1, wherein said inorganic compound is phosphoric acid.

3. A method of partially forming oxide layers on a surface of an inorganic substrate, consisting essentially of:
    (a) a step of forming a layer comprising an oxide on the surface of an inorganic substrate;
    (b) a step of contacting a fixed portion of the oxide layer of step (a) with an inorganic compound in order to dissolve the oxide layer of step (a) with the inorganic compound, wherein said inorganic compound is not the same as the oxide of step (a); and
    (c) a step of removing the dissolved portion of the oxide layer from step (b) together with the inorganic compound,
wherein said inorganic substrate is a glass plate and said inorganic compound is a glass containing at least one compound selected from the group consisting of $P_2O_5$, PbO, $B_2O_3$, ZnO, and $Bi_2O_3$.

4. A method of partially forming oxide layers as claimed in claim 3, wherein the inorganic compound has a melting point of 500° C. or lower, or a softening point of 500° C. or lower.

5. A method of partially forming oxide layers as claimed in claim 3 or 4, wherein step (b) comprises heating said fixed portion of the oxide layer of step (a) together with said inorganic compound.

* * * * *